United States Patent
Erban

(10) Patent No.: US 11,142,077 B2
(45) Date of Patent: Oct. 12, 2021

(54) METHOD AND DEVICE FOR OPERATING A MOTOR VEHICLE, AND MOTOR VEHICLE

(71) Applicant: Robert Bosch GmbH, Stuttgart (DE)

(72) Inventor: Andreas Erban, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 16/323,394

(22) PCT Filed: Jun. 8, 2017

(86) PCT No.: PCT/EP2017/063937
§ 371 (c)(1),
(2) Date: Feb. 5, 2019

(87) PCT Pub. No.: WO2018/028854
PCT Pub. Date: Feb. 15, 2018

(65) Prior Publication Data
US 2020/0223316 A1 Jul. 16, 2020

(30) Foreign Application Priority Data
Aug. 11, 2016 (DE) .......................... 102016214925.3

(51) Int. Cl.
*B60L 15/38* (2006.01)
*B60K 1/02* (2006.01)
*B60K 7/00* (2006.01)
*B60K 23/08* (2006.01)

(52) U.S. Cl.
CPC ............... *B60L 15/38* (2013.01); *B60K 1/02* (2013.01); *B60K 7/0007* (2013.01); *B60K 23/08* (2013.01); *B60K 2007/0092* (2013.01)

(58) Field of Classification Search
CPC ...................................................... B60L 15/38
See application file for complete search history.

(56) References Cited

U.S. PATENT DOCUMENTS

| | | | | |
|---|---|---|---|---|
| 5,799,745 A * | 9/1998 | Fukatani | ................ | B62D 7/159 180/410 |
| 7,418,329 B2 * | 8/2008 | Yasui | .................... | B60T 8/1769 701/41 |
| 7,997,373 B2 * | 8/2011 | Yasui | .................. | B60W 30/045 180/197 |

(Continued)

FOREIGN PATENT DOCUMENTS

| DE | 4133060 A1 * | 4/1993 | ............... B60K 6/52 |
|---|---|---|---|
| DE | 4133060 A1 | 4/1993 | |

(Continued)

OTHER PUBLICATIONS

International Search Report for PCT/EP2017/063937, dated Sep. 27, 2017.

*Primary Examiner* — Shelley Chen
(74) *Attorney, Agent, or Firm* — Norton Rose Fulbright US LLP; Gerard Messina

(57) ABSTRACT

A method for operating a motor vehicle which includes at least one wheel axle having two drive wheels, each drive wheel being drivable with the aid of a wheel-specific drive unit for the purpose of moving the motor vehicle on a roadway. It is provided that the drive units of the wheel axle are controlled as a function of a difference between the longitudinal forces applicable at the drive wheels of the wheel axle to the roadway.

12 Claims, 1 Drawing Sheet

(56) References Cited

U.S. PATENT DOCUMENTS

| | | | | |
|---|---|---|---|---|
| 8,116,942 | B2 * | 2/2012 | Yasui | B62D 7/159 |
| | | | | 701/41 |
| 8,165,756 | B2 * | 4/2012 | Yasui | B62D 6/005 |
| | | | | 701/42 |
| 10,029,678 | B2 * | 7/2018 | Mogi | B60L 15/20 |
| 10,167,043 | B2 * | 1/2019 | Monna | B62K 21/20 |
| 2007/0294009 | A1 * | 12/2007 | Yasui | B60T 8/1769 |
| | | | | 701/41 |
| 2008/0119988 | A1 * | 5/2008 | Yasui | B62D 7/159 |
| | | | | 701/41 |
| 2009/0095562 | A1 * | 4/2009 | Yasui | B62D 7/159 |
| | | | | 180/412 |
| 2009/0248250 | A1 * | 10/2009 | Yasui | B62D 6/008 |
| | | | | 701/42 |
| 2009/0271074 | A1 * | 10/2009 | Hulten | B62D 6/003 |
| | | | | 701/42 |
| 2015/0060174 | A1 * | 3/2015 | Kim | B60K 7/0007 |
| | | | | 180/197 |
| 2016/0272197 | A1 * | 9/2016 | Hulten | B62D 6/003 |
| 2017/0080926 | A1 * | 3/2017 | Mogi | B60W 30/02 |
| 2017/0267309 | A1 * | 9/2017 | Monna | B62K 5/08 |

FOREIGN PATENT DOCUMENTS

| | | | | |
|---|---|---|---|---|
| DE | 102009055160 A1 * | 6/2011 | | B60L 7/14 |
| DE | 102009055160 A1 | 6/2011 | | |
| EP | 2752340 A1 | 7/2014 | | |
| JP | 2005020830 A | 1/2005 | | |
| JP | 2013176203 A * | 9/2013 | | |
| JP | 2013176203 A | 9/2013 | | |

* cited by examiner

METHOD AND DEVICE FOR OPERATING A MOTOR VEHICLE, AND MOTOR VEHICLE

FIELD OF THE INVENTION

The present invention relates to a method for operating a motor vehicle which includes at least one wheel axle having two drive wheels, each drive wheel being drivable with the aid of a wheel-specific drive unit for the purpose of moving the motor vehicle on a roadway. Furthermore, the present invention relates to a device for operating a motor vehicle of this type as well as to a motor vehicle including such a device.

BACKGROUND INFORMATION

In the case of motor vehicles, it is now customary that the driving stability of the motor vehicle is ensured even in critical situations by adjusting the braking torques for each individual wheel. The ESP system (ESP=electronic stability program), in particular, is to be named here. In this case, a brake intervention for traction control is automatically carried out to prevent the wheels of the motor vehicle from losing their static friction to the roadway. It is thus achieved that even in critical driving situations cornering forces at the wheels are ensured which allow for a safe driving operation of the motor vehicle.

As a result of the increasing electrification of motor vehicles, it is moreover possible in an increasingly simple manner to individually apply a torque to the drive wheels of the motor vehicle. In particular, when using wheel-individual drives which are connected to the particular drive wheel directly or via a transmission, adjusting a wheel-individual torque is readily possible.

SUMMARY OF THE INVENTION

The method according to the present invention having the features of claim 1 has the advantage that brake interventions for the purpose of stabilizing the driving operation in the case of driving or during acceleration may be largely dispensed with, thus sparing the braking system, which is subject to wear during operation, and increasing its service life. At the same time, however, the same safety as in the case of the known brake interventions for traction control is ensured for the motor vehicle. According to the present invention, this is achieved in that the drive units of the wheel axle are controlled as a function of a difference between the longitudinal forces applicable at the drive wheels of this wheel axle to the roadway. As a result, the drive units are controlled in such a way that they generate different torques, for example, to meet the difference which has an effect on the static friction potential at the particular wheel, so that a wheel axle and the drive wheels do not lose their static friction to the roadway. By taking into account the friction coefficient difference, it is ensured in particular that the two drive wheels of the same wheel axle deliver a drive torque as well as cornering forces to the roadway in the case of a μ-split situation, for example.

The difference may be determined as a function of an instantaneous friction coefficient or a friction coefficient potential between the roadway and the particular drive wheel, a wheel speed of the particular drive wheel, a longitudinal acceleration of the motor vehicle, a transverse acceleration of the motor vehicle and/or a contact force of the particular drive wheel on the roadway. As a function of the contact force and the friction coefficient potential, it is established in particular what static friction is instantaneously acting between the roadway and the drive wheel. In this case, the contact force results, inter alia, from the longitudinal acceleration and the transverse acceleration of the motor vehicle. In the knowledge of the instantaneous static friction between the drive wheel and the roadway, the longitudinal force applicable in each case is ascertainable, so that the drive units may be advantageously controlled as a function thereof, as already described above.

It is in particular provided that a torque difference is determined for the drive wheels of the wheel axle as a function of the difference and is taken into account when controlling the drive unit of this wheel axle. In this case, the torque difference is in particular selected proportionally to the difference, so that the two drive wheels use the same friction coefficient potential at least essentially.

It furthermore may be provided that the drive units are controlled to generate in each case a setpoint wheel torque for the wheel axle as a function of a requested axle drive torque. The setpoint wheel torque is thus predefined as a function of an axle drive torque which is requested by the driver or by an automated driving system and using which the motor vehicle is to be driven overall.

Here, it may be provided that the particular setpoint wheel torque is determined from the half of the axle drive torque and from the half of the torque difference. To make sure that the wheel axle outputs the desired axle driving setpoint torque overall, same is equally divided between the two drive wheels or the two drive units. In order to advantageously adjust the torque difference at the wheels, same is also halved between the two drive units.

It is in particular provided in this case, that the half of the torque difference at one of the drive wheels is added to the half of the axle drive torque and subtracted from the half of the axle drive torque at the other one of the drive wheels. In this way, the desired torque difference is easily adjusted at the drive wheels and the desired axle drive torque of the wheel axle is ensured at the same time.

A maximum torque difference is advantageously predefined as a function of an instantaneous driving situation. The torque difference is thus delimited as a function of an instantaneous driving situation of the motor vehicle. This allows for a highly dynamic or sporty driving experience of the motor vehicle, for example.

The instantaneous driving situation may be ascertained as a function of an adjusted steering angle, a steering torque applied by the driver of the motor vehicle, a transverse force, an acceleration force, a rotation rate and/or a driving speed of the motor vehicle. In particular, the longitudinal accelerations and the transverse accelerations, as already discussed previously, are detected and taken into account for the evaluation of the contact forces of the drive wheels.

The device according to the present invention having the features described herein is characterized by a specially configured control unit which carries out the method according to the present invention when used according to its intended purpose. This results in the advantages already mentioned above. In particular, the method and the device allow for comfortable driving, even in the case of inhomogeneous friction coefficients of the roadway. Especially at the wheel axles including the wheel-specific drive units, it is not necessary to use braking torques to stabilize the wheels. The driver achieves a reproducible driving behavior using the same accelerator pedal positioning, regardless of whether the motor vehicle moves on a roadway having a homogeneous friction coefficient or having an inhomogeneous friction coefficient. This is ensured at least as long as permitted by the potentials of the drive units. The wheel brakes of the motor vehicle, which are based on friction, are spared, wear is minimized, and comfort is further increased. In particular, the energy in the wheel brakes is not lost due to a brake intervention, so that an energy-efficient operation of the motor vehicle may be carried out.

The motor vehicle according to the present invention having the features described herein is characterized by the device according to the present invention. This results in the advantages already mentioned above.

In particular, the drive units are each configured as electric machines, in particular as wheel-proximal electric machines. This ensures a direct and loss-free force transmission from the electric machines to the particular drive wheel.

Other advantages and features and feature combinations result, in particular, from the previous description as well as from the descriptions herein. In the following, the present invention is to be elucidated in greater detail with reference to the drawings.

DETAILED DESCRIPTION

Figure 1:
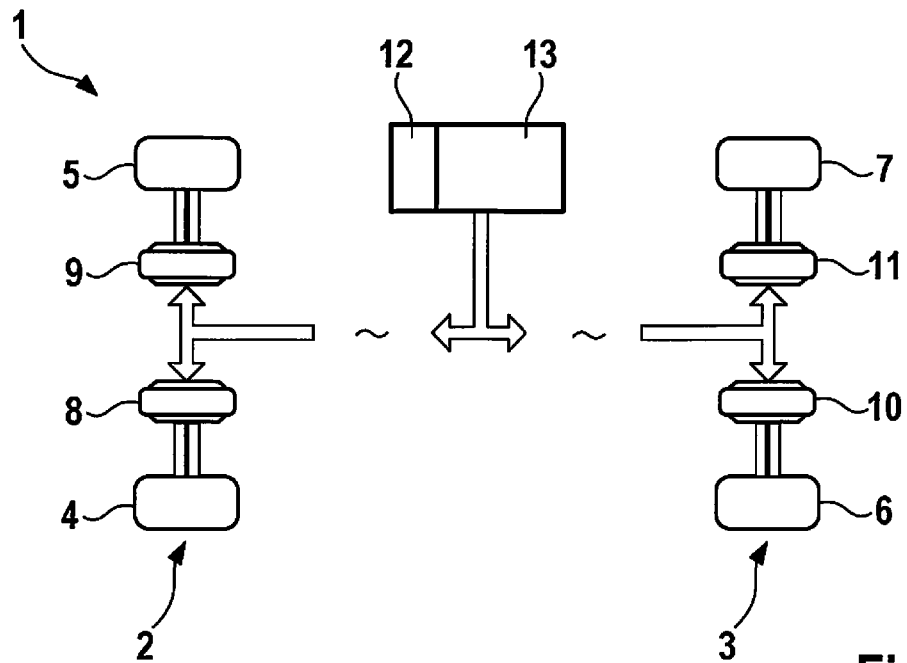
FIG. 1 shows in a simplified top view a motor vehicle according to a first exemplary embodiment.

In a simplified top view, FIG. 1 shows a motor vehicle 1 which includes a front wheel axle 2 and a rear wheel axle 3. Both wheel axles 2, 3 each include two drive wheels 4, 5 and 6, 7, respectively. Each of drive wheels 4 through 7 is assigned a drive unit 8, 9, 10, and 11 in each case. Drive units 8 through 11 are coupled or mechanically operatively connected to particular drive wheels 4 through 7, respectively. According to the present exemplary embodiment, drive units 8 through 11 are each configured as electric machines which are operable, in particular, by a motor and, optionally, also by a generator. Drive machines 8 through 11 are controlled by a control unit 12 and receive the electrical energy necessary for their drive from an electrical energy store 13.

Control unit 12 controls drive units 8, 9, and 10, 11 of particular wheel axle 2, 3 as a function of a difference between the longitudinal forces which are applicable to the roadway at drive wheels 4, 5 and 6, 7 of particular wheel axle 2, 3 in order to ensure a stable driving operation without static friction loss. Here, control unit 12 carries out a method which predefines setpoint wheel torques for drive units 8, 9, and 10, 11 in a wheel-specific manner starting from a requested axle drive torque for one of wheel axles 2, 3 and starting from a differential torque determined as a function of the difference, so that wheel-specific brake interventions are dispensed with with the aid of a braking system (not illustrated in FIG. 1) for stabilizing motor vehicle 1.

In this way, a comfortable driving operation of the motor vehicle is also achieved for inhomogeneous friction coefficients of a roadway in the case of which drive wheels 4, 6 are provided with a lower friction coefficient than drive wheels 5, 7, for example. Even in the case of changing or alternating friction coefficient conditions, a stable guidance of the motor vehicle is ensured due to sufficiently high cornering forces. The driver achieves a reproducible driving behavior at the same accelerator pedal position, regardless of whether motor vehicle 1 moves on a roadway having a homogeneous friction coefficient or on a roadway having an inhomogeneous friction coefficient, the braking system being spared and its service life thus increased.

A total drive torque is determined for motor vehicle 1 as a function of the accelerator pedal actuation. It is then distributed among wheel axles 2, 3 to ensure an optimal driving operation. Drive torques $M_A$ are thus determined from the total drive torque for wheel axles 2, 3 which may be predefined to be identical or different.

A control method usually provides the drive torque as a sum torque for the applicable axle drive torque of the particular wheel axle, the drive torque being implemented, in a classic configuration, by one single engine which is connected via a transmission and a differential to two drive wheels of a wheel axle. The known control method also provides a setpoint differential torque which is implemented as a hydraulic braking torque in the classic case. This setpoint differential torque or the torque difference is determined as a function of the friction coefficients of drive wheels 4, 5 of wheel axle 2 and of drive wheels 6, 7 of wheel axle 3 in the present case. Here, the friction coefficients may be ascertained in a manner known per se during the driving operation of motor vehicle 1, for example. The axle drive torque for wheel axle 3, for example, and differential torque $M_D$ are now used to determine setpoint wheel torque $M_{10}$, $M_{11}$ for particular drive unit 10 and 11 of wheel axle 3:

$$M_{10} = 0.5*(M_A - M_D)/i_G$$

$$M_{11} = 0.5*(M_A + M_D)/i_G$$

Here, gear ratio $i_G$ between particular drive machine 10, 11 and associated drive wheel 6, 7 is also taken into account. Drive machines 8, 9 of wheel axle 2 may be controlled analogously thereto.

This means that this method is used to compute the particular setpoint wheel torque for drive machines 8 through 11 as a function of torque difference $M_D$. In this case, the steady portion is included in the half of axle drive torque $M_A$, the wheel-specific portion is included in the half of torque difference $M_D$ in each case.

As soon as a torque difference is needed, because motor vehicle 1 is moving on a roadway having an inhomogeneous friction coefficient, for example, setpoint wheel torque $M_{10}$ is decreased by half of the value of torque difference $M_D$ on the side having the lower friction coefficient. On the side having the higher friction coefficient, setpoint wheel torque $M_{11}$ is simultaneously increased by half of the value of torque difference $M_D$.

In contrast to conventional methods, in which a brake intervention is used to stabilize the driving operation, a torque increase is thus possible, thus allowing for an improved driving stability. The setpoint torques are delimited by the particular drive potential of drive machines 8 through 11. Drive torque $M_A$ is delimited by the vehicle control, for example based on the driver input or an otherwise determined value for the total drive torque of motor vehicle 1.

Torque difference $M_D$ is delimited to a maximum value as a function of the driving situation. Here, reference is made in particular to the steering effort of the driver, i.e. for the applied steering torque, the vehicle speed, the used friction coefficient potential, as well as other known variables for characterizing the driving situation of a motor vehicle.

Figure 2:
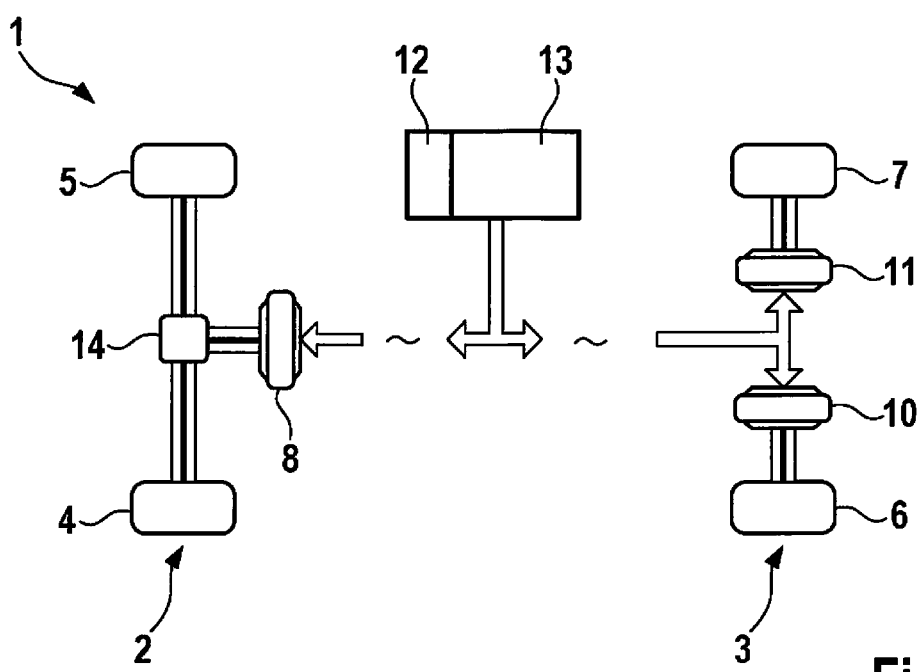
FIG. 2 shows in a simplified top view a motor vehicle according to a second exemplary embodiment.

FIG. 2 shows a second exemplary embodiment, the elements already known from FIG. 1 being provided with the same reference numerals. Essentially, the differences are to be further discussed in the following.

In contrast to the preceding exemplary embodiment, it is provided in this case that front wheel axle 2 is only assigned one drive machine 8 which is operatively connected or coupled via a differential 14 to the two drive wheels 5, 4 of front axle 2. Drive machines 10, 11 of rear wheel axle 3 may be controlled as described above. In the case of front wheel axle 2, is implemented as a function of torque difference $M_D$ at front wheel axle 2 through active brake interventions at particular wheel 4, 5, as is known from the related art. In this case, the following applies for the overall drive:

$$M_8 = M_A/i_{G14}$$

$$M_{10} = 0.5*(M_A - M_D)/i_G$$

$$M_{11} = 0.5*(M_A + M_D)/i_G$$

When determining setpoint wheel torque $M_8$ for drive machine 8 or drive unit 8, only gear ratio $i_{G14}$ as well as axle drive torque $M_A$ is taken into account for wheel axle 2. The torque difference is implemented, as already mentioned above, through brake interventions and differential 14.

Naturally, the above-described method may also be carried out in a motor vehicle 1 which includes only one drive wheel at front wheel axle 2, for example, or more than two wheel axles, each having two drive wheels and two drive machines.

What is claimed is:

1. A method for operating a motor vehicle, which includes at least one wheel axle having two drive wheels, the method comprising:
    controlling, via a control unit, each of the drive units of the wheel axle as a function of a difference between the longitudinal forces applicable to a roadway at the drive wheels of the wheel axle to the roadway, so as to ensure stable driving operation without static friction loss; and
    driving each of the drive wheels with a wheel-specific drive unit to move the motor vehicle on a roadway;
    wherein each of the drive wheels is assigned a corresponding one of the drive units,
    wherein the drive units each include an electric machine which is operable by a motor and/or by a generator,
    wherein each of the drive units are controlled by the control unit and receive electrical energy necessary for their drive from an electrical energy store, and
    wherein the control unit carries out a process which predefines setpoint wheel torques for the drive units in a wheel-specific manner starting from a requested axle drive torque for one of the wheel axles and starting from a differential torque determined as a function of the difference, so that wheel-specific brake interventions by a braking system are not needed.

2. The method of claim 1, wherein the difference is determined as a function of an instantaneous friction coefficient between the roadway and the particular drive wheel, a wheel speed of the particular drive wheel, a longitudinal acceleration of the motor vehicle and/or a contact force of the particular drive wheel.

3. The method of claim 1, wherein a torque difference is determined for the drive wheels as a function of the difference and is adjusted when controlling the drive units.

4. The method of claim 1, wherein the drive units are controlled to generate in each case setpoint wheel torque as a function of a requested axle drive torque for the wheel axle.

5. The method of claim 1, wherein the setpoint wheel torque is determined from the half of the axle drive torque from the half of the torque difference.

6. The method of claim 1, wherein the half of the torque difference is added to the half of the drive torque at one of the drive wheels and subtracted from the half of the drive torque at the other one of the drive wheels.

7. The method of claim 1, wherein a maximum torque difference is predefined as a function of an instantaneous driving situation.

8. The method of claim 1, wherein the driving situation is ascertained as a function of an adjusted steering angle, a steering torque applied by the driver of the motor vehicle, a transverse force, an acceleration force, a rotation rate and/or a driving speed of the motor vehicle.

9. A device for operating a motor vehicle, which includes at least one wheel axle having two drive wheels, comprising:
    a control unit configured to perform the following:
        controlling each of the drive units of the wheel axle as a function of a difference between the longitudinal forces applicable to a roadway at the drive wheels of the wheel axle to the roadway, so as to ensure stable driving operation without static friction loss; and
        driving each of the drive wheels with a wheel-specific drive unit to move the motor vehicle on a roadway;
        wherein each of the drive wheels is assigned a corresponding one of the drive units,
        wherein the drive units each include an electric machine which is operable by a motor and/or by a generator,
        wherein each of the drive units are controlled by the control unit and receive electrical energy necessary for their drive from an electrical energy store, and
        wherein the control unit carries out a process which predefines setpoint wheel torques for the drive units in a wheel-specific manner starting from a requested axle drive torque for one of the wheel axles and starting from a differential torque determined as a function of the difference, so that wheel-specific brake interventions by a braking system are not needed.

10. A motor vehicle, comprising:
    at least one wheel axle having two drive wheels, wherein each of the drive wheels is assigned an individually controllable drive unit; and
    a control unit configured to perform the following:
        controlling each of the drive units of the wheel axle as a function of a difference between the longitudinal forces applicable to a roadway at the drive wheels of the wheel axle to the roadway, so as to ensure stable driving operation without static friction loss; and
        driving each of the drive wheels with a wheel-specific drive unit to move the motor vehicle on a roadway;
        wherein each of the drive wheels is assigned a corresponding one of the drive units,
        wherein the drive units each include an electric machine which is operable by a motor and/or by a generator,
        wherein each of the drive units are controlled by the control unit and receive electrical energy necessary for their drive from an electrical energy store, and
        wherein the control unit carries out a process which predefines setpoint wheel torques for the drive units in a wheel-specific manner starting from a requested axle drive torque for one of the wheel axles and starting from a differential torque determined as a function of the difference, so that wheel-specific brake interventions by a braking system are not needed.

11. The motor vehicle of claim 10, wherein the drive units include wheel-proximal electric machines.

12. The motor vehicle of claim 9, wherein the drive units include wheel-proximal electric machines.

\* \* \* \* \*